United States Patent
Fushimi

(10) Patent No.: US 9,578,707 B2
(45) Date of Patent: Feb. 21, 2017

(54) LIGHTING SYSTEM, CONTROL METHOD, AND CONTROL APPARATUS

(71) Applicant: Panasonic Intellectual Property Management Co., Ltd., Osaka (JP)

(72) Inventor: Shigemi Fushimi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/080,787

(22) Filed: Mar. 25, 2016

(65) Prior Publication Data
US 2016/0302276 A1  Oct. 13, 2016

(30) Foreign Application Priority Data
Apr. 8, 2015  (JP) ................. 2015-079524

(51) Int. Cl.
 *H05B 33/08* (2006.01)
 *H05B 37/02* (2006.01)

(52) U.S. Cl.
CPC ...... *H05B 33/0848* (2013.01); *H05B 33/0854* (2013.01); *H05B 37/0263* (2013.01); *H05B 37/0281* (2013.01)

(58) Field of Classification Search
CPC . H05B 33/08; H05B 33/0848; H05B 33/0863; H05B 37/02; H05B 37/0272; H05B 37/0281; H05B 37/0218; H05B 37/0254; H05B 37/0263
USPC ........ 315/131, 149, 158, 291, 308; 700/275, 700/295, 296, 297
See application file for complete search history.

(56) References Cited

U.S. PATENT DOCUMENTS

| 8,664,886 B2 * | 3/2014 | Ostrovsky | H05B 33/0815 315/247 |
| 2009/0248217 A1 * | 10/2009 | Verfuerth | H05B 37/02 700/295 |
| 2010/0241255 A1 * | 9/2010 | Benetz | H05B 37/02 700/90 |
| 2013/0034172 A1 * | 2/2013 | Pettler | H04B 3/54 375/257 |

(Continued)

FOREIGN PATENT DOCUMENTS

| JP | 2005-108748 A | 4/2005 |
| JP | 2009-176477 A | 8/2009 |

(Continued)

*Primary Examiner* — Thai Pham
(74) *Attorney, Agent, or Firm* — McDermott Will & Emery LLP

(57) ABSTRACT

A lighting system includes: a demand controller which outputs a demand signal; a control panel which suspends supply of power from a power line for a first predetermined time period by controlling switches based on the demand signal; and a light fixture which includes a light emitter, a detector, an occupancy sensor, and a controller which, if the detector detects that the power being supplied to the light fixture emitting light in a first illumination state is suspended for the first predetermined time period: causes the light fixture to emit light in a second illumination state dimmer than the first illumination state if the occupancy sensor has sensed a person; and causes the light emitter to emit light in a third illumination state dimmer than the second illumination state if the occupancy sensor has sensed no one.

11 Claims, 10 Drawing Sheets

(56) References Cited

U.S. PATENT DOCUMENTS

2014/0265897 A1* 9/2014 Taipale ................. H05B 37/02
                                              315/200 R
2014/0285111 A1   9/2014 Takahashi

FOREIGN PATENT DOCUMENTS

| JP | 2009-240032 A | 10/2009 |
| JP | 2009-240054 A | 10/2009 |
| JP | 2011-129318 A | 6/2011 |
| JP | 2012-015076 A | 1/2012 |
| JP | 2013-218840 A | 10/2013 |
| JP | 2014-186964 A | 10/2014 |

* cited by examiner

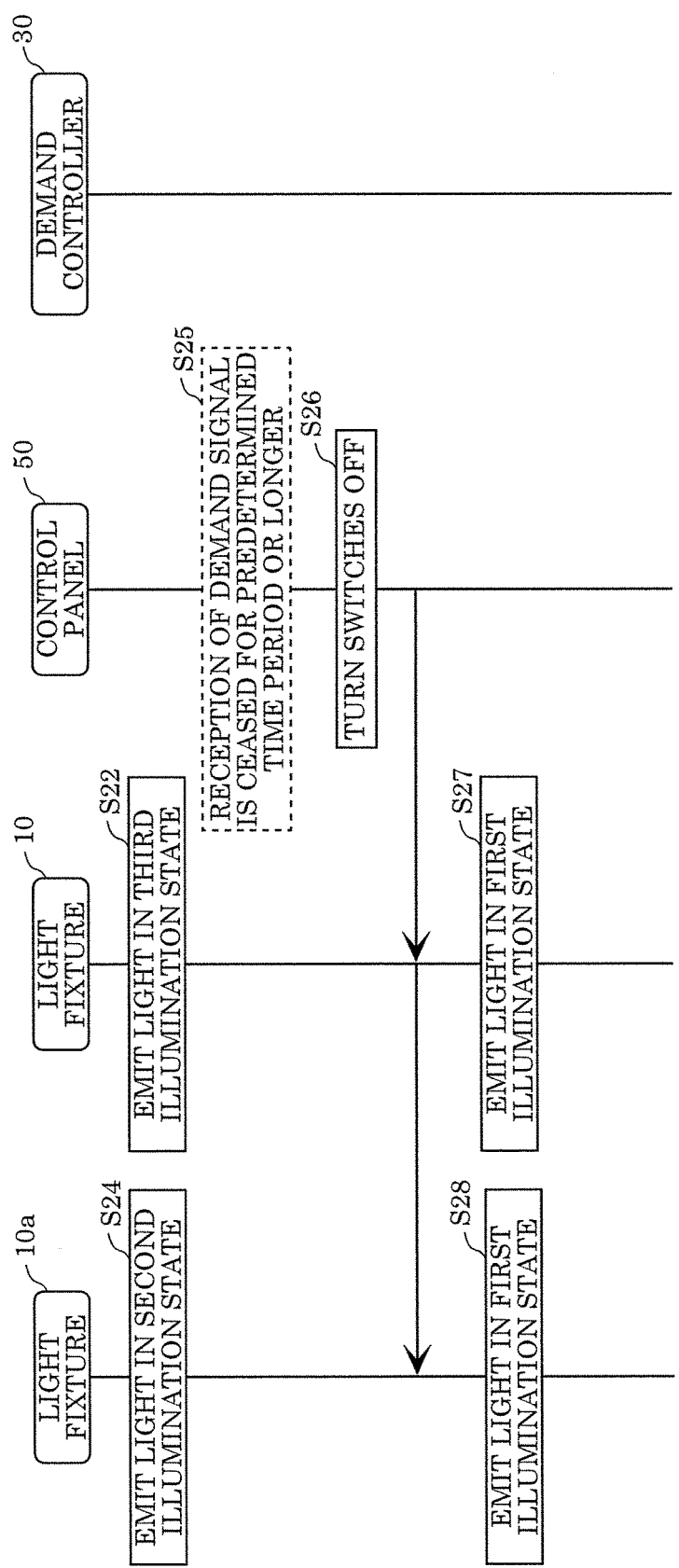

LIGHTING SYSTEM, CONTROL METHOD, AND CONTROL APPARATUS

CROSS REFERENCE TO RELATED APPLICATION

This application claims the benefit of priority of Japanese Patent Application Number 2015-079524, filed Apr. 8, 2015, the entire content of which is hereby incorporated by reference.

BACKGROUND

1. Technical Field

The present disclosure relates to a lighting system and control apparatus which perform demand control.

2. Description of the Related Art

In recent years, with a movement to a stabilized power system and the liberalization of the power market, energy management systems are drawing attention. For example, a demand control system is known which estimates a total power usage (demand) by a consumer, and controls electric appliances (e.g., such as air conditioning equipment and lighting equipment) belonging to the consumer such that the power usage does not exceed a contracted amount of power (e.g., see Japanese Unexamined Patent Application Publication No. 2009-240032).

SUMMARY

An example of the demand control system as mentioned above is, for example, a lighting system which performs demand control on a plurality of light fixtures and uniformly dims all the plurality of light fixtures according to a demand signal. Such a lighting system dims the light fixtures, without taking into an account as to whether each light fixture is in use. This may end up compromising user comfort and safety.

The present disclosure provides a lighting system and control apparatus which perform demand control, providing enhanced user comfort and safety.

A lighting system according to one aspect of the present disclosure includes: a light fixture to be connected to a distribution panel via a power line, which emits light using power supplied from the power line; a demand controller which obtains a total power usage by a plurality of devices including the light fixture, which are connected to the distribution panel via power lines, and outputs a demand signal according to the total power usage; a control apparatus which includes a switch provided on the power line connected to the light fixture, and a switch controller which suspends supply of the power for a first predetermined time period by turning off the switch for the first predetermined time period if the switch controller receives the demand signal; and an occupancy sensor, wherein the light fixture includes a light emitter which emits light using the power supplied, a detector which detects that supply of the power is suspended, and a controller which, if the detector detects that the power being supplied to the light fixture emitting light in a first illumination state is suspended for the first predetermined time period: (i) causes the light emitter to emit light in a second illumination state dimmer than the first illumination state if the occupancy sensor has sensed a person in a second predetermined time period immediately before the detector detects that the power being supplied to the light fixture emitting light in the first illumination state is suspended for the first predetermined time period; and (ii) causes the light emitter to emit light in a third illumination state dimmer than the second illumination state if the occupancy sensor has sensed no one in the second predetermined time period.

A control apparatus according to one aspect of the present disclosure includes: a plurality of switches provided on respective power lines connecting a distribution panel and a plurality of light fixtures corresponding to the plurality of switches; and a switch controller which suspends supply of power to the plurality of light fixtures for a first predetermined time period at different times by turning off the plurality of switches for the first predetermined time period based on a demand signal output according to a total power usage by a plurality of devices including the plurality of light fixtures and which are connected to the distribution panel via power lines.

According to the present disclosure, a lighting system and control apparatus are achieved which perform demand control, providing enhanced user comfort and safety.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 10 is a diagram illustrating operation sequence of the light fixtures returning to a first illumination state in the lighting system according to Embodiment 1.

DETAILED DESCRIPTION OF THE EMBODIMENTS

Hereinafter, a lighting system according to embodiments of the present disclosure is to be described, with reference to the accompanying drawings. The embodiments described below are each general and specific illustration. Values, shapes, materials, components, and arrangement and connection between the components, steps, and the order of the steps shown in the following embodiments are merely illustrative and not intended to limit the present disclosure. Among the components in the embodiments below, components not recited in any one of the independent claims indicating the top level concept of the present disclosure are described as arbitrary components.

Figures are schematic views and do not necessarily illustrate the present disclosure precisely. In the figures, the same reference signs are used to refer to substantially the same configuration, and duplicate description may be omitted or simplified.

Embodiment 1

[Overall Configuration of Lighting System]

Figure 1:
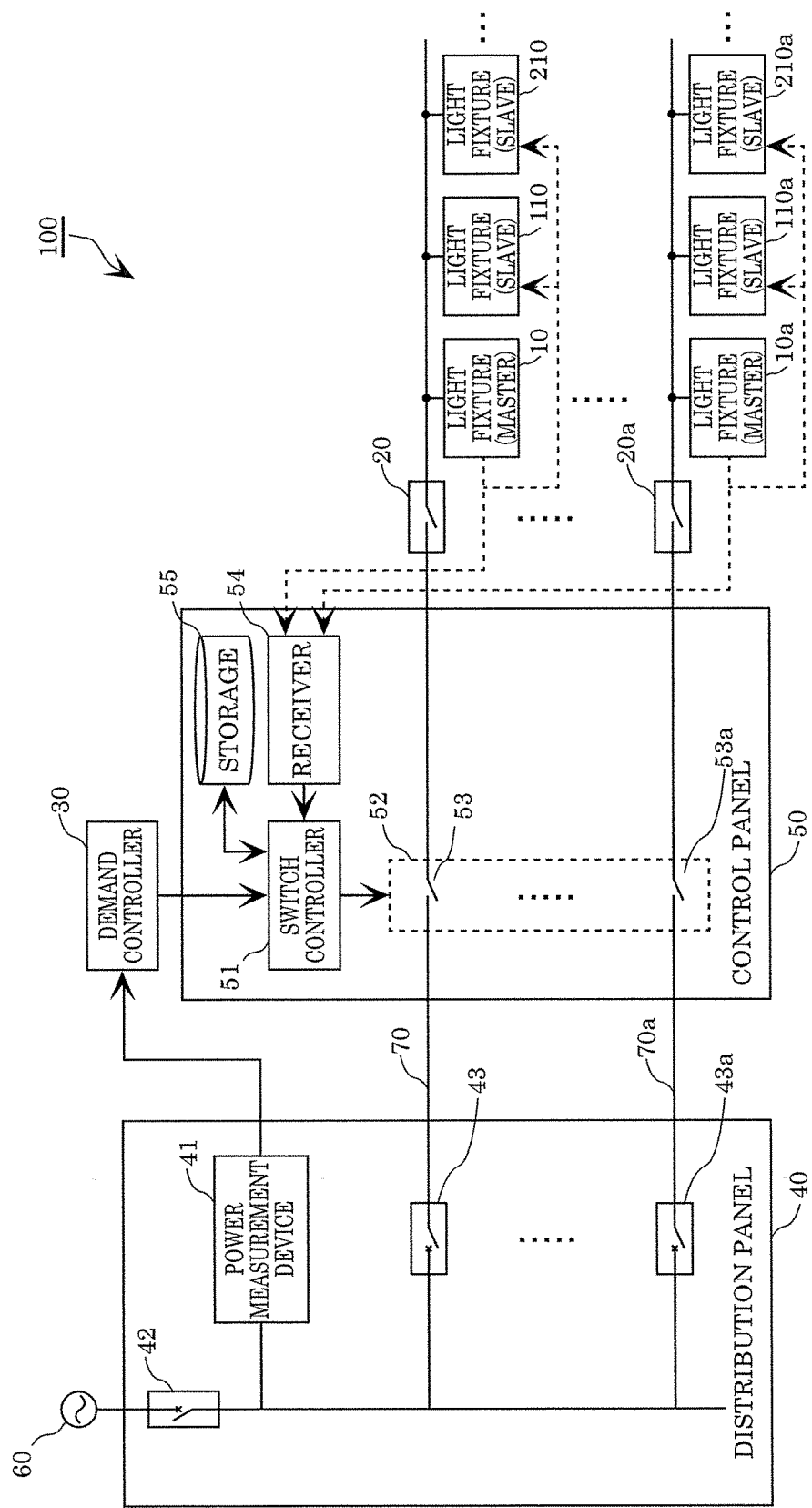
FIG. 1 is a block diagram showing configuration of a lighting system according to Embodiment 1.

First, overall configuration of a lighting system according to Embodiment 1 is described. FIG. 1 is a block diagram showing configuration of the lighting system according to Embodiment 1.

As shown in FIG. 1, lighting system 100 includes a plurality of light fixtures (e.g., light fixtures 10, 110, 210, 10a, 110a, and 210a), demand controller 30, distribution panel 40, and control panel 50. FIG. 1 additionally shows power line 70 connecting light fixtures 10, 110, and 210 to distribution panel 40, and wall switch 20 on power line 70. Likewise, the figure also shows power line 70a connecting light fixture 10a, 110a, and 210a to distribution panel 40, and wall switch 20a on power line 70a. It should be noted that the number of light fixtures that are included in lighting system 100 is not particularly limited.

In lighting system 100, the plurality of light fixtures which are be connected to distribution panel 40 are dimmed if a total power usage by the light fixtures increases. A feature of lighting system 100 is that an illumination state (brightness) into which each light fixture is placed is different depending on whether there is a person in the vicinity of a light fixture. In the following, the components included in such a lighting system 100 are described in detail.

Light fixture 10 is connected to distribution panel 40 via power line 70, and emits light using power supplied from power line 70. Light fixture 10 acts as a master of light fixtures 110 and 210. Stated differently, light fixtures 110 and 210 act as slaves of light fixture 10. Light fixture 10 acting as a master is the same as light fixtures 110 and 210 acting as slaves, except that light fixture 10 acting as a master includes an occupancy sensor. The configurations of light fixtures 10, 110, and 210 are described in detail below.

It should be noted that light fixture 10a has the same configuration as light fixture 10, and light fixtures 110a and 210a have the same configuration as light fixtures 110 and 210, and thus detailed description thereof may be omitted. Moreover, in Embodiment 1 below, light fixtures 10, 110, and 210 may be referred to as light fixtures included in a first group, and light fixtures 10a, 110a, and 210a may be referred to as light fixtures included in a second group.

Wall switch 20 is mounted on a wall of a building, and used by a user to switch lights on and off of the light fixtures included in the first group. Wall switch 20 may be any generic switch. The same applies to wall switch 20a.

Distribution panel 40 provides a plurality of devices (a plurality of circuits), connected thereto via the power lines, with power supplied from power system 60 (commercial system). Here, the plurality of devices which are connected to distribution panel 40 include the light fixtures included in the first group and the light fixtures included in the second group. The plurality of devices also include air conditioning equipment (air conditioner), for example. Distribution panel 40 may be a lighting panel to which only the light fixtures are connected.

Distribution panel 40 includes a box-like housing (not shown), master breaker 42 in the housing, and branch breakers (branch breakers 43 and 43a in FIG. 1) each provided per power line (circuit) connected to distribution panel 40.

If a current more than a predetermined current (a current based on power determined under a contract with a power company) is supplied from power system 60, master breaker 42 suspends supply of the power from power system 60.

If overcurrent flows through power lines 20 and 20a to which branch breakers 43 and 43a are respectively connected, branch breakers 43 and 43a suspend supply of the power to power lines 20 and 20a, respectively.

In Embodiment 1, distribution panel 40 includes power measurement device 41. Power measurement device 41 is a power meter which measures a total power usage by the plurality of devices connected to distribution panel 40 via the power lines. Power measurement device 41 outputs to demand controller 30 the measured power usage in a form of a measurement signal.

Demand controller 30 manages, for example, the running conditions and the power usage by the plurality of devices that are connected to distribution panel 40 via the power lines.

In Embodiment 1, demand controller 30 obtains the power usage by the plurality of devices that are connected to distribution panel 40 via the power lines, and outputs a demand signal according to the power usage. Demand controller 30, specifically, obtains a total power usage by the plurality of devices which is measured by power measurement device 41 included in distribution panel 40, and outputs the demand signal if the total power usage is estimated to exceed a predetermined target usage. While power measurement device 41 and demand controller 30 are wired by a communication line in Embodiment 1, it should be noted that the communications method is not particularly limited. Power measurement device 41 and demand controller 30 may communicate with each other, for example, wirelessly.

Demand controller 30 estimates that the power usage is to exceed the predetermined target usage, if, for example, the power usage exceeds a predetermined threshold (e.g., 80% of the target usage) and the power usage thereafter remains above the predetermined threshold for a predetermined time period. In other words, demand controller 30 outputs the demand signal in such a case. While the demand signal is a binary electric signal which, for example, changes to high if demand controller 30 estimates that the power usage is to exceed the target usage, and changes to low otherwise, it should be noted that the demand signal may be any other aspect.

It should be noted that a plurality of predetermined thresholds as described above may be used for the estimation. Demand controller 30 may output a first demand signal if the power usage has exceeded a first threshold (e.g., 80% of the target usage), and output a second demand signal if the power usage has exceeded a second threshold (e.g., 90% of the target usage).

It should be noted that demand controller 30 may obtain a total power usage by a plurality of devices which are provided separately from distribution panel 40 and connected to distribution panel 40, from a smart meter or external server (e.g., an electric utility's server) which measures the total power usage by the plurality of devices. In this case, demand controller 30 may communicate with the smart meter and the like, using any communications network including wired and wireless networks. The communications method (communications standard) is not particularly limited either.

It should be noted that the target usage and the predetermined threshold can arbitrarily be changed by the user through a user interface (not shown in FIG. 1) on demand controller 30.

Control panel 50 is by way of example of a control apparatus. Control panel 50 includes switch unit 52, switch controller 51, receiver 54, and storage 55. Switch unit 52 consists of a plurality of switches (switches 53 and 53a in FIG. 1). Switches 53 and 53a have substantially the same function and thus the following provides description of switch 53 only and the description of switch 53a is omitted.

Switch unit 52 is a switch device which includes the plurality of switches the tuning on and off of which are controlled by switch controller 51. Switch unit 52 includes switches 53 and 53a.

Switch 53 is provided on power line 70 connected to light fixture 10. Switch 53 is implemented by, for example, a relay element or power transistor, for example.

Switch controller 51 turns off the plurality of switches (e.g., switches 53 and 53a) included in switch unit 52 for a first predetermined time period based on the demand signal output from demand controller 30, thereby suspending supply of the power to the plurality of light fixtures for the first predetermined time period. In other words, switch controller 51 turns switches 53 and 53a off for the first predetermined time period based on the demand signal, and then turns them back on (hereinafter, may be referred to simply as instant-off control). It should be noted that the first predetermined time period is, for example, 1 second or longer and 2 seconds or less.

Moreover, in Embodiment 1, switch controller 51 turns off the plurality of switches included in switch unit 52 for the first predetermined time period at different times. Switch controller 51 turns off the plurality of switches for the first predetermined time period in a manner that a switch indicated by identification information received by receiver 19a in a third predetermined time period immediately before switch controller 51 receives the demand signal is turned off later in time than turning off a switch corresponding to a light fixture from which receiver 19a has received no identification information in the third predetermined time period immediately before switch controller 51 receives the demand signal. It should be noted that the third predetermined time period is, for example, 30 minutes or longer and less than two hours. Such operation performed by switch controller 51 is to be described in detail below.

Switch controller 51, specifically, uses electric signals (control signals) to turn on and off the plurality of switches included in switch unit 52. Switch controller 51 is implemented by, for example, a microcomputer, but may be implemented by a processor or dedicated circuit.

It should be noted that in Embodiment 1, switch controller 51 (control panel 50) and demand controller 30 are wired by a communication line, and transmit and receive demand signals therebetween through the communication line. However, for example, switch controller 51 and demand controller 30 may perform wireless communications with each other. The communications method (communications standard) or the like is not particularly limited either.

Receiver 54 receives sensing signals, and identification information of light fixture 10 acting as a master. The sensing signals and identification information of light fixture 10 are transmitted by light fixture 10. The identification information is, specifically, an ID of light fixture 10 and from which switch 53 corresponding to light fixture 10 (switch 53a in the case of light fixture 10a) is indirectly identifiable using storage 55 described below. However, the identification information may also be information from which switch 53 corresponding to light fixture 10 is directly identifiable. In other words, the identification information may at least be information which directly or indirectly indicates switch 53 corresponding to light fixture 10.

The sensing signal is a signal which is broadcasted by light fixture 10 acting as a master when the occupancy sensor included in light fixture 10 senses a person. It should be noted that the sensing signal is not mandatory. The sensing signal may not be transmitted to control panel 50 if switch 53 corresponding to light fixture 10 is identifiable from the identification information transmitted by light fixture 10.

Receiver 54 is, specifically, a wireless communication circuit (wireless communications module), and performs wireless communications through weak radio communications with light fixtures 10 and 10a acting as masters. It should be noted that the standard for the wireless communications performed by receiver 54 is not particularly limited, and may be any standard, such as the standard for specified low power radio, wireless LAN, or infrared communications, for example. Alternatively, receiver 54 may be a communication circuit (communication module) for wired communications, and perform wired communications with light fixtures 10 and 10a.

Storage 55 is a memory device storing priorities of the plurality of switches included in switch unit 52. The priorities as used herein refer to prioritization according to which the plurality of switches included in switch unit 52 are turned instant-off. In Embodiment 1, the identification information items of the plurality of light fixtures, switches corresponding to the plurality of light fixtures, and the priorities of the switches are stored in association with one another in storage 55.

A priority of a switch stored in storage 55 is rewritten to a low priority if receiver 54 receives identification information and a sensing signal from a light fixture corresponding to the switch. Switch controller 51 turns off the plurality of switches included in switch unit 52 one after another each for the first predetermined time period, according to the priorities stored in storage 55. In other words, a switch corresponding to a light fixture installed in a room occupied is turned instant-off later in time than turning off a switch corresponding to a light fixture installed in a room vacant. It should be noted that the rewritten priority of the switch is reset to the default if receiver 54 does not receive the identification information and a sensing signal from the light fixture corresponding to the switch for a period of time or longer.

Storage 55 is, for example, a semiconductor memory such as flash memory or electrically erasable programmable read-only memory (EEPROM). It should be noted that storage 55 may be included in switch controller 51.

[Configuration of Light Fixture]

Figure 2:
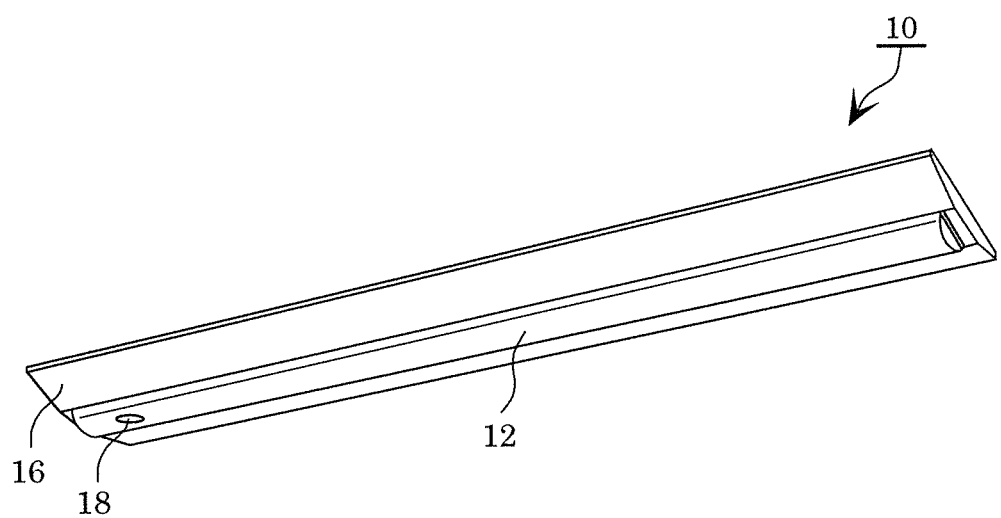
FIG. 2 is an external view of a light fixture according to Embodiment 1.
Figure 3:
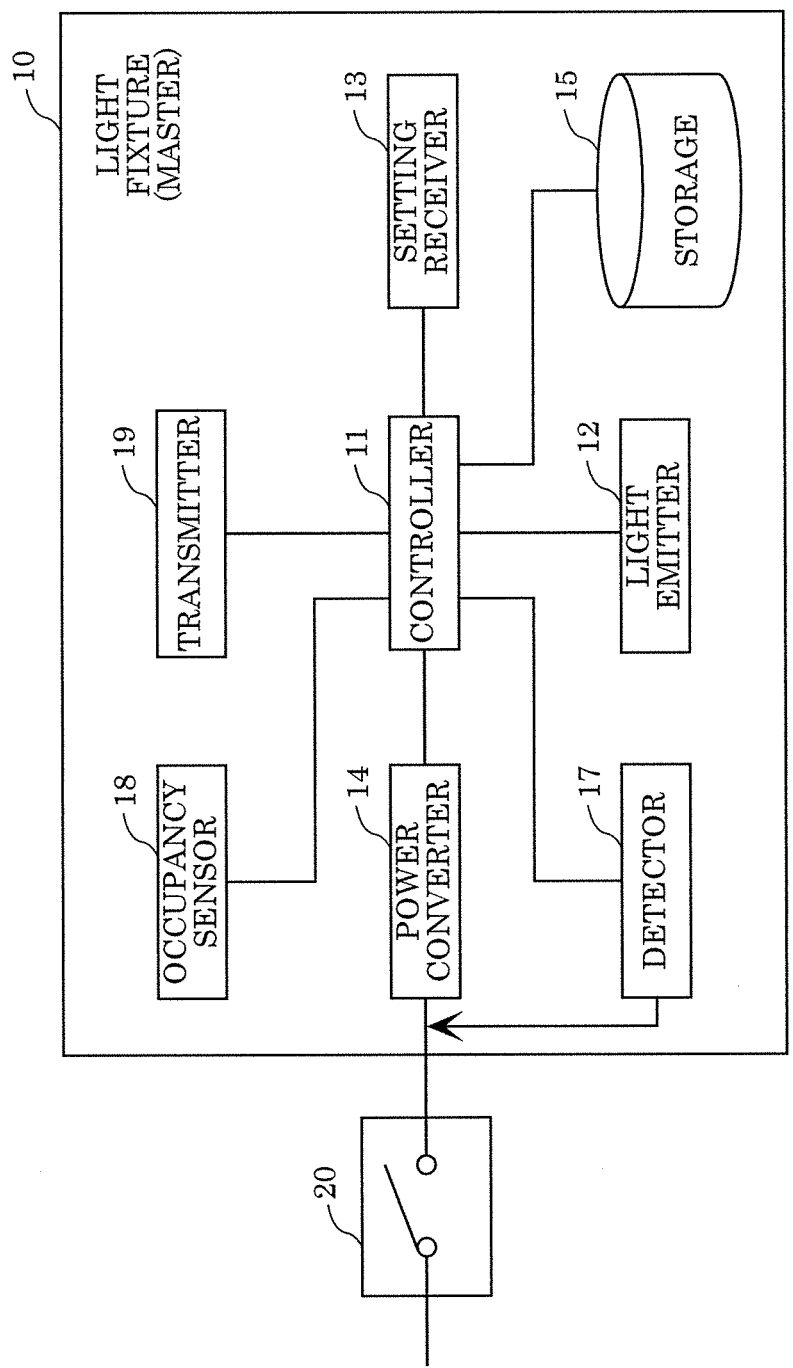
FIG. 3 is a block diagram showing functional configuration of a light fixture acting as a master.

Next, the configuration of light fixture 10 is described in detail. First, the configuration of light fixture 10 acting as a master is described. FIG. 2 is an external view of light fixture 10 acting as a master. FIG. 3 is a block diagram showing functional configuration of light fixture 10 acting as a master. It should be noted that light fixture 10a has the similar or the same configuration as light fixture 10.

As shown in FIGS. 2 and 3, light fixture 10 includes fixture body 16, light emitter 12, power converter 14, detector 17, controller 11, setting receiver 13, storage 15, occupancy sensor 18, and transmitter 19.

Fixture body 16 is fixed to the ceiling by, for example, bolts and nuts.

Light emitter 12 emits light using power supplied from power line 70 (more specifically, power supplied from controller 11). Light emitter 12, more specifically, includes a light emitting module and a cover member covering the light emitting module.

The light emitting module includes a substrate and at least one LED element mounted as an at least one light emitting element on the substrate. The light emitting module may be a COB (chip on board) light emitting module in which at least one LED chip is directly mounted on a substrate, or may be an SMD (surface mount device) light emitting module on which at least one surface-mounted LED element is mounted on a substrate. The surface-mounted LED element is a packaged LED element in which at least one LED chip is mounted inside a resin-molded cavity and the cavity is sealed with a phosphor-containing resin.

The cover member transmits light emitted by the light emitting module. The cover member is formed of, for example, a light-transmissive glass or light-transmissive resin, but may be formed of a white resin containing a light diffusing material (fine particles), such as silica or calcium carbonate.

Power converter 14 converts AC power supplied thereto from power system 60 via power line 70 into DC power and outputs the DC power to controller 11. Power converter 14 is, specifically, for example, a bridge full-wave rectifier circuit, but may be any aspect, such as an AC-to-DC converter IC.

Detector 17 detects suspension of supply of the power from power line 70. Detector 17, specifically, detects suspension of supply of the power for the first predetermined time period (instant-off). The first predetermined time period as used herein is, but not particularly limited to, one second or longer and two seconds or less, for example.

Detector 17 is a circuit which includes a detection circuit for detecting, for example, instant-off of switch 53. The detection circuit is to be described in detail below. It should be noted that detector 17 may be implemented by a microcomputer or processor.

Controller 11 controls emission of light from light emitter 12, using the DC power output from power converter 14. In Embodiment 1, if detector 17 detects that switch 53 providing power to light emitter 12 emitting light in a first illumination state is turned instant-off and occupancy sensor 18 has sensed a person in a second predetermined time period which is immediately before detector 17 detects the instant-off of switch 53, controller 11 causes light emitter 12 to emit light in a second illumination state dimmer than the first illumination state. If occupancy sensor 18 has sensed no one in the second predetermined time period immediately before detector 17 detects the instant-off of switch 53, on the other hand, and detector 17 detects the instant-off of switch 53, controller 11 causes light emitter 12 to emit light in a third illumination state dimmer than the second illumination state.

The second predetermined time period is, specifically, but is not particularly limited to, 30 minutes. The length of the second predetermined time period may be changeable according to user needs, and may be set to for example, a time period (30 minutes, 60 minutes, 90 minutes, etc.) which is an integer multiple of 30 minutes. It should be noted that the setting is changed, for example, through setting receiver 13 described below.

Such control of light emission allows light emitter 12 to emit light brighter when a person is expected to be in the vicinity of light fixture 10 than when no one is expected to be in the vicinity of light fixture 10, thereby providing enhanced user comfort and safety.

If detector 17 detects that the power being supplied from power line 70 to light fixture 10 emitting light in the second illumination state or the third illumination state is suspended longer than the first predetermined time period, and supply of the power is resumed, controller 11 causes light emitter 12 to emit light in the first illumination state. In other words, controller 11 returns light fixture 10 from the second illumination state or the third illumination state to the first illumination state. The time period longer than the first predetermined time period (a fourth predetermined time period) as used herein refers to, but not limited to, a time period longer than two seconds in Embodiment 1, which is three seconds, for example.

Such a configuration allows the user to return light emitter 12 to the first illumination state by turning wall switch 20 off and turning it back on after a passage of a time period longer than the duration of the instant-off. It should be noted that light emitter 12 may be returned to the first illumination state by switch controller 51 based on the demand signal or by user operation of a remote control (input of an indication to setting receiver 13).

Controller 11 is, for example, a circuit which includes a chopper control circuit which regulates power to be supplied to light emitter 12. Specific examples of the chopper control circuit include a pulse width modulation (PWM) circuit, and pulse frequency modulation (PFM) circuit. It should be noted that controller 11 may be implemented by a microcomputer or processor.

Setting receiver 13 receives settings of the first illumination state, the second illumination state, and the third illumination state which are adjusted by the user. Setting receiver 13 is, specifically, a receiver included in the remote control. The user makes the settings of the first illumination state, the second illumination state, and the third illumination state through the remote control. It should be noted that the "illumination states" as used herein also include a full-on state (100% of dimming ratio). It is assumed that in Embodiment 1, the first illumination state is set to the full-on state, the second illumination state is set to a state in which the dimming ratio is 50%, and the third illumination state is set to a state in which the dimming ratio is 25%.

It should be noted that a specific aspect of setting receiver 13 is not limited to the receiver included in the remote control. Setting receiver 13 may be, for example, hardware, such as a DIP switch.

Storage 15 is a memory device (memory) into which the settings of the illumination states received by setting receiver 13 are stored. The settings of the illumination state stored in storage 15 are referred to by controller 11.

In addition, if occupancy sensor 18 senses a person, this is stored as such into storage 15. Specifically, for example, if occupancy sensor 18 senses a person, controller 11 sets an illumination flag stored in storage 15 to "1," and if occupancy sensor 18 senses no one for the second predetermined time period after the flag is set to "1," controller 11 sets the flag to "0."

Owing to such a configuration, if detector 17 detects the instant-off of switch 53, controller 11 determines, by referring to the flag stored in storage 15, whether occupancy sensor 18 has sensed a person in the second predetermined time period.

Storage 15 is, specifically, a semiconductor memory such as flash memory or electrically erasable programmable read-only memory (EEPROM). It should be noted that storage 15 may be included in controller 11.

Occupancy sensor 18 senses presence of a person in a sensing range, and outputs an electric signal to controller 11. Occupancy sensor 18 is, for example, a passive infrared ray (PIR) sensor, and senses infrared radiation emitted from the human body (changes in temperature) in the sensing range. In other words, occupancy sensor 18 is able to sense a heat radiating object. It should be noted that occupancy sensor 18 is not limited to a PIR sensor, and may be a thermal imaging sensor in which a plurality of infrared detector elements are arrayed, or an active sensor. Alternatively, occupancy sensor 18 may be an imaging module which includes an image sensor, such as a CMOS image sensor, and a processor for image processing.

When occupancy sensor 18 included in light fixture 10 senses a person, transmitter 19 transmits the identification information of light fixture 10 and a sensing signal, of which the sensing signal is for causing light fixtures 110 and 210 acting as slaves (light fixtures that does not include occupancy sensor 18) to emit light in the second illumination state or the third illumination state. The sensing signal is broadcasted by transmitter 19 and received by control panel 50 (receiver 54) and light fixtures 110 and 210 acting as slaves. It should be noted that when transmitter 19 included in light fixture 10 transmits the sensing signal, if a light fixture (light fixtures 110a and 210a) belonging to a different group receives the sensing signal, the sensing signal is ignored.

For example, if light fixture 110a receives the identification information and the sensing signal transmitted by transmitter 19 included in light fixture 10, controller 11 included in light fixture 110a matches the identification information transmitted thereto and the identification information stored in storage 15 included in light fixture 110a. If the identification information transmitted by transmitter 19 is not stored in storage 15 included in light fixture 110a, controller 11 included in light fixture 110a ignores the sensing signal. Here, in storage 15 included in light fixture 110a, the identification information of light fixture 10a is stored, whereas the identification information of light fixture 10 is not. Thus, controller 11 included in light fixture 110a ignores the sensing signal.

Transmitter 19 is, specifically, a wireless communication circuit (wireless communications module), and performs wireless communications through weak radio communications with receiver 54 included in control panel 50. It should be noted that, as with receiver 54, an aspect of communications performed by transmitter 19 is not particularly limited.

Figure 4:
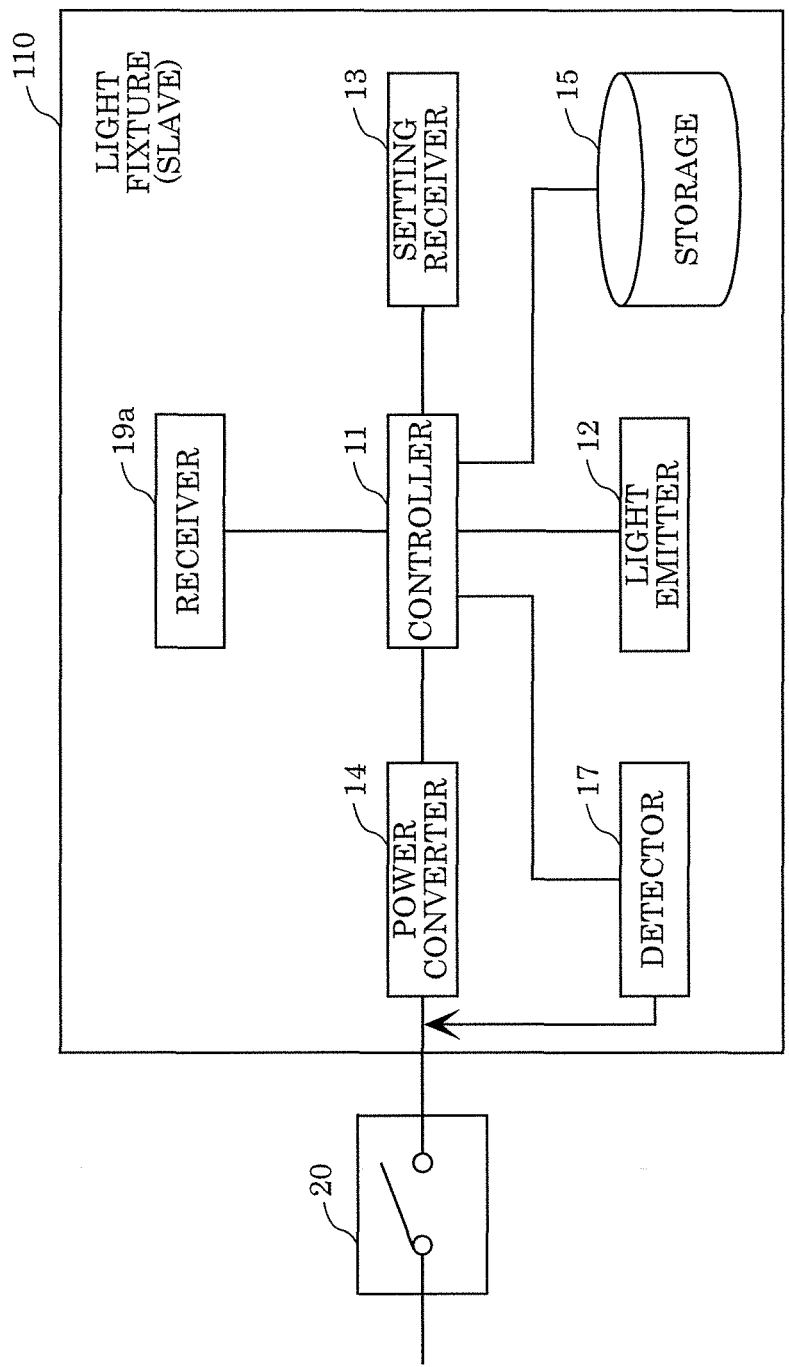
FIG. 4 is a block diagram showing functional configuration of a light fixture acting as a slave.

Next, light fixture 110 acting as a slave is described. FIG. 4 is a block diagram showing functional configuration of light fixture 110 acting as a slave. It should be noted that light fixture 110 has the same the appearance as light fixture 10, except that light fixture 110 is provided without occupancy sensor 18. The appearance of light fixture 110 is thus not depicted. It should be noted that light fixtures 210, 110a, and 210a have the same configuration as light fixture 110 as well.

As shown in FIG. 4, unlike light fixture 10, light fixture 110 acting as a slave does not include occupancy sensor 18 and transmitter 19, but includes receiver 19a. In the following, light fixture 110 is described, focusing on differences from light fixture 10.

Receiver 19a receives the sensing signal broadcasted by transmitter 19 included in light fixture 10 acting as a master.

Receiver 19a is, specifically, a wireless communication circuit (wireless communications module), and performs wireless communications through weak radio communications with transmitter 19. It should be noted that an aspect of communications performed by receiver 19a is not particularly limited.

For example, receiver 19a may perform infrared communications. In this case, receiver 19a is an infrared light receiver. It should be noted that in such a case, the infrared light receiver may double as receiver 19a and setting receiver 13. This reduces the number of parts and the cost.

In addition, if receiver 19a receives the sensing signal, that is, occupancy sensor 18 included in light fixture 10 senses a person, this is stored as such into storage 15 included in light fixture 110. Specifically, for example, if receiver 19a receives the sensing signal, controller 11 included in light fixture 110 sets an illumination flag stored in storage 15 included in light fixture 110 to "1," and if receiver 19a receives no sensing signal for the second predetermined time period, controller 11 sets the flag to "0."

Owing to such a configuration, if detector 17 included in light fixture 110 detects the instant-off of switch 53, controller 11 included in light fixture 110 determines, by referring to the flag stored in storage 15 included in light fixture 110, whether occupancy sensor 18 included in light fixture 10 has sensed a person in the second predetermined time period.

Figure 5:
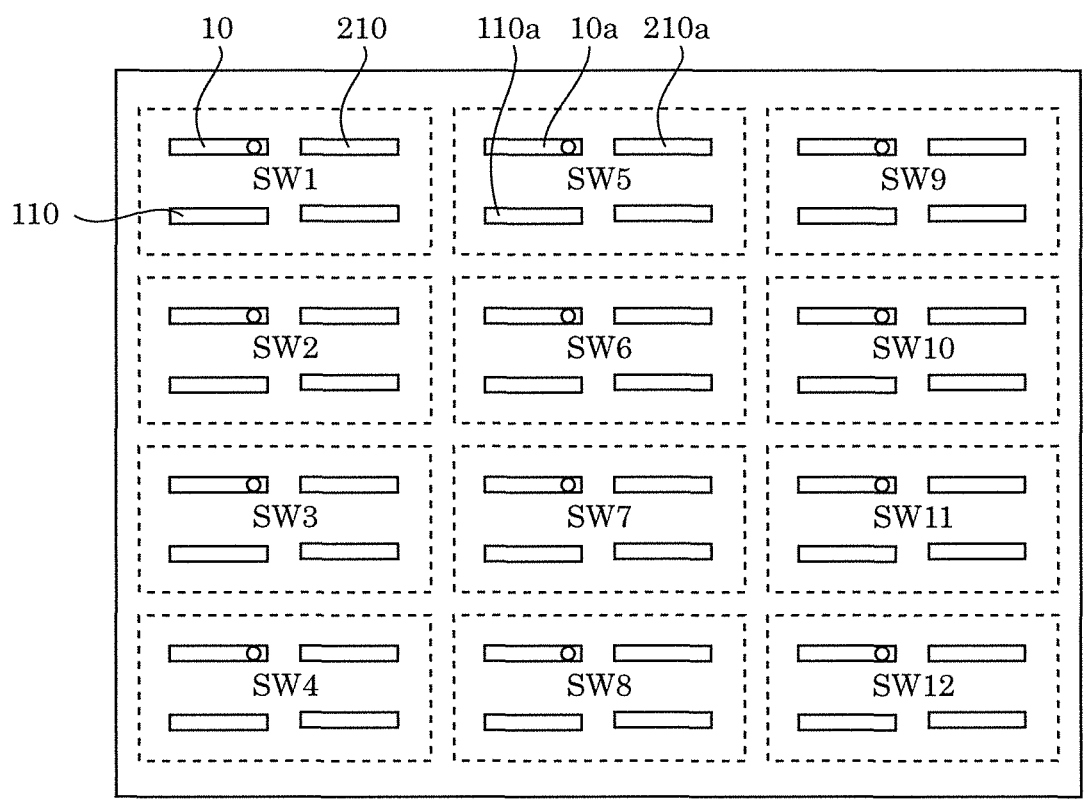
FIG. 5 is a diagram for illustrating an example of arrangement of the light fixtures.

Light fixture 10 (light fixture 10a) acting as a master and light fixture 110 (light fixtures 210, 110a, and 210a) acting as a slave have been described above. In Embodiment 1, these light fixtures are divided into groups and disposed per group. FIG. 5 is a diagram for illustrating an example of arrangement of the light fixtures. FIG. 5 schematically shows arrangement of the light fixtures when looking at a ceiling surface from a lower perspective.

In FIG. 5, the light fixtures indicated by a dashed line correspond to one group.

One group includes one master and three slaves. For example, the group on the upper left of FIG. 5 is the above-mentioned first group in which light fixtures 10, 110, and 210 are included. The group on the right side of the first group is the above-mentioned second group in which light fixtures 10a, 110a, and 210a are included.

One group is provided with one master and one switch (which is denoted as SW1 to SW12 in the figure). Here, as described above, a master (e.g., light fixture 10) broadcasts a sensing signal to control panel 50, and slaves (e.g., light fixtures 110 and 210) included in the group to which the master belongs to.

The switch provided for each group corresponds to one of the plurality of switches included in switch unit 52. For example, SW1 corresponds to switch 53, and SW5 corresponds to switch 53a. Switch controller 51 is able to perform the demand control (dimming control) on one group by turning instant-off one of the switches included in switch unit 52. In other words, switch controller 51 is able to perform the demand control on the plurality of light fixtures per group.

Thus, in the case where the plurality of light fixtures are disposed a group-by-group basis on the ceiling of one room as shown in FIG. 5, switch controller 51 is able to partially perform the demand control on the plurality of light fixtures an area-by-area basis. For example, switch controller 51 is able to perform the demand control on the plurality of light fixtures such that a specific area (e.g., a conference space, etc.) in a room has a lower (or higher) priority than another area.

[Instant-Off of Detection Circuit]

Figure 6:
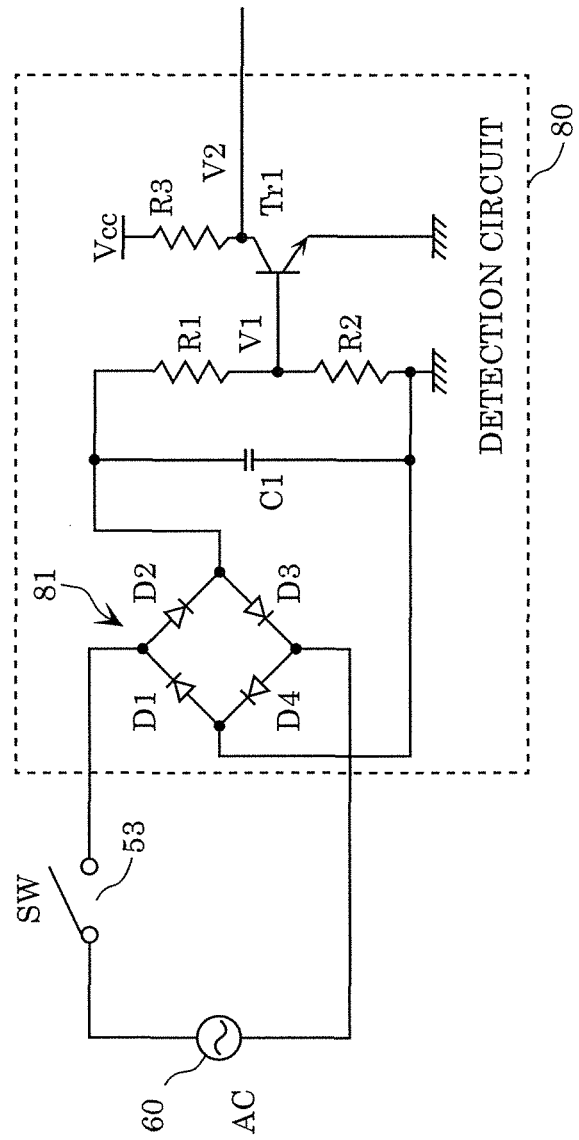
FIG. 6 is a circuit diagram of a detection circuit.
Figure 7:
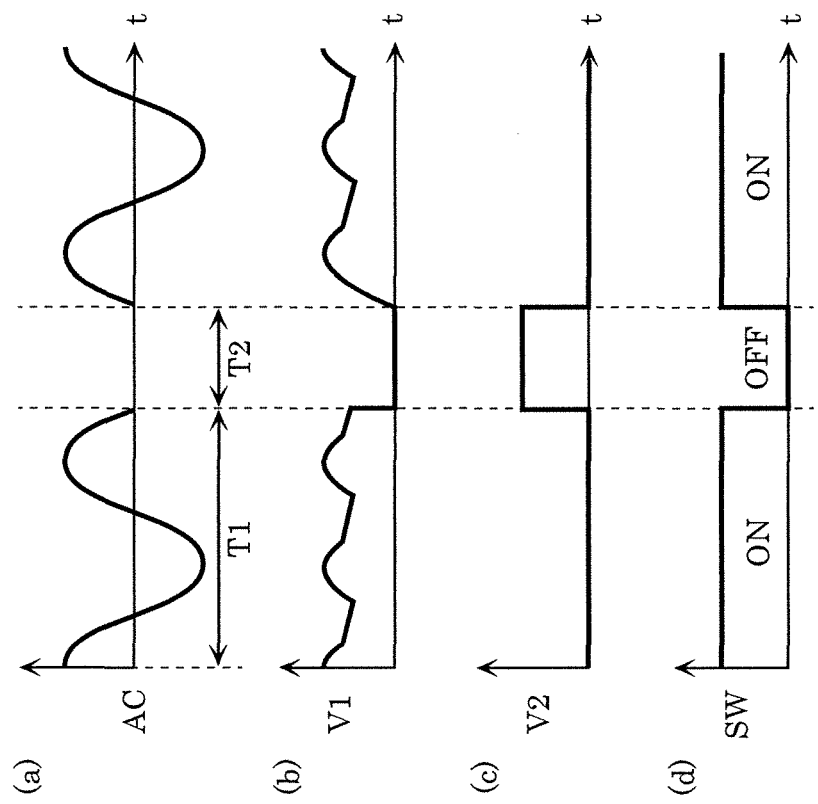
FIG. 7 is a diagram schematically illustrating voltage waveforms in the detection circuit.

Next, one example of the detection circuit, included in detector 17, which detects instant-off of switch 53 is described. FIG. 6 is a circuit diagram of the detection circuit. FIG. 7 is a diagram showing voltage waveforms in the detection circuit. It should be noted that FIG. 6 shows a configuration that is related to the instant-off detection only. FIG. 7 is a schematic view, and not precisely depicting the levels and frequencies of the voltage waveforms.

Detection circuit 80 detects instant-off of switch 53 from power system 60. Detection circuit 80 includes bridge full-wave rectifier circuit 81 comprising four diodes D1, D2, D3, and D4. Full-wave rectifier circuit 81 rectifies an alternating-current voltage (AC) from power system 60 shown in (a) of FIG. 7, using diodes D1 to D4. It should be noted that in the case where power converter 14 described above includes a full-wave rectifier circuit, the full-wave rectifier circuit may be utilized in place of full-wave rectifier circuit 81.

The rectified voltage is smoothed by smoothing capacitor C1, divided by resistance R1 and resistance R2, and input to the base of transistor Tr1. Here, a base voltage (voltage V1) of transistor Tr1 has a waveform as depicted in (b) of FIG. 7. Here, a peak value of voltage V1 is, for example, about 5 V.

Voltage V1 is greater than a threshold voltage of transistor Tr1 during time period T1 during which switch 53 is ON, and thus transistor Tr1 is ON. Consequently, a collector voltage (voltage V2) of transistor Tr1 is low (0 V) during time period T1, as shown in (c) of FIG. 7.

During time period T2 during which switch 53 is OFF, on the other hand, voltage V1 is pulled down by resistance R2 to 0 V less than the threshold voltage of transistor Tr1, and thus transistor Tr1 is OFF. Consequently, voltage V2 is high (Vcc) during time period T2, as shown in (c) of FIG. 7.

As described above, voltage V2 output from detection circuit 80 corresponds ON and OFF of switch 53 shown in (d) of FIG. 7. Thus, detector 17 is able to detect instant-off of switch 53 by monitoring (sampling) such output from detection circuit 80.

[Operation 1 of Lighting System]

Figure 8:
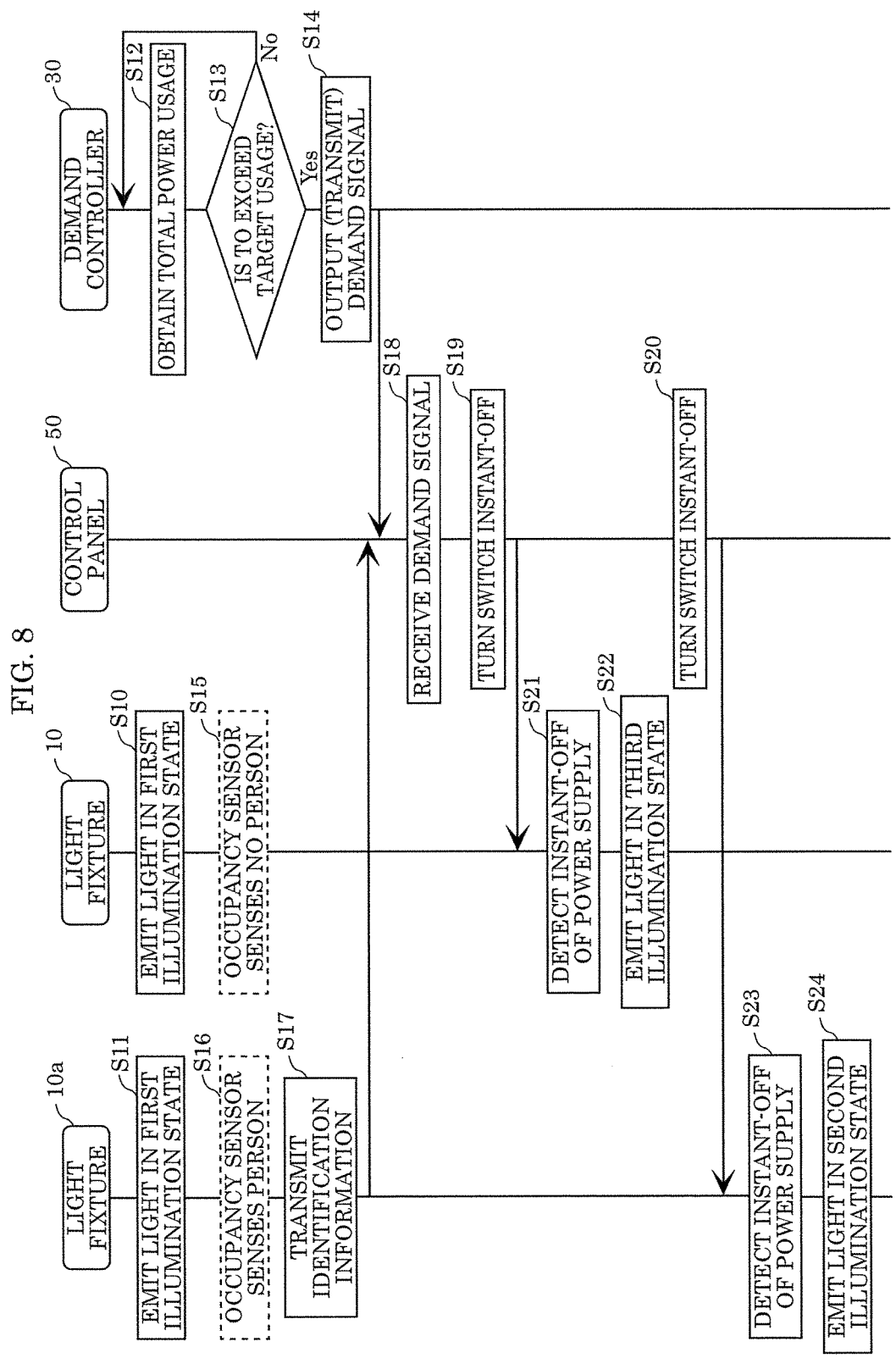
FIG. 8 is a diagram illustrating operation sequence of the lighting system according to Embodiment 1.

Next, operation of lighting system 100 is described, with reference to FIG. 8. FIG. 8 is a diagram illustrating operation sequence of lighting system 100.

First, controller 11 included in light fixture 10 causes light emitter 12 included in light fixture 10 to emit light in the first illumination state, that is, full rights on (S10). Likewise, controller 11 included in light fixture 10a causes light emitter 12 included in light fixture 10a to emit light in the first illumination state (S11). Although not shown, assume that light fixtures 110, 210, 110a, and 210a acting as slaves are emitting light in the first illumination state as well at this time point.

In the meantime, demand controller 30 obtains a total power usage by light fixtures 10 and 10a from power measurement device 41 (S12), and determines whether the total power usage is expected to exceed the target usage (S13). As described above, in Embodiment 1, if the total power usage is estimated to exceed the target usage (Yes in S13), demand controller 30 outputs to control panel 50 a demand signal indicating that the total power usage is estimated to exceed the target usage (S14).

Here, in the example of FIG. 8, occupancy sensor 18 included in light fixture 10 has sensed no one in the third predetermined time period immediately before the output of the demand signal (≈ in the third predetermined time period immediately before switch controller receives the demand signal) (S15). The occupancy sensor included in light fixture 10a, on the other hand, has sensed a person in the third predetermined time period immediately before the demand signal is output (S16), and thus transmitter 19 included in light fixture 10a transmits the identification information indicative of switch 53a corresponding to light fixture 10a to receiver 54 included in control panel 50 (S17). The third predetermined time period, for example, ends when switch controller 51 has received the demand signal, and begins a predetermined length of time before the ending time of the third predetermined time period.

Although not shown, in step S17, transmitter 19 included in light fixture 10a broadcasts a sensing signal and control panel 50 and light fixtures 110a and 210a receive the sensing signal.

If switch controller 51 included in control panel 50 receives from demand controller 30 the demand signal output in step S14 (S18), switch controller 51 turns instant-off the plurality of switches included in switch unit 52 at different times (S19). In the example of FIG. 8, receiver 54 receives the identification information from light fixture 10a, but not from light fixture 10. As a result, a priority of switch 53 stored in storage 55 is higher than a priority of switch 53a.

Thus, switch controller 51, first, turns switch 53 instant-off (S19) to suspend the power supplied from power line 70 to light fixture 10 for the first predetermined time period. Switch controller 51 thereafter turns switch 53a instant-off (S20) to suspend the power supplied from power line 70 to light fixture 10a for the first predetermined time period.

In this manner, switch controller 51 turns switch 53a and switch 53 off for the first predetermined time period such that switch 53a indicated by the identification information received by receiver 54 in the third predetermined time period immediately before control panel 50 receives the demand signal is turned off later in time than turning off switch 53 corresponding to light fixture 10 from which receiver 54 receives no identification information in the third predetermined time period.

Figure 9:
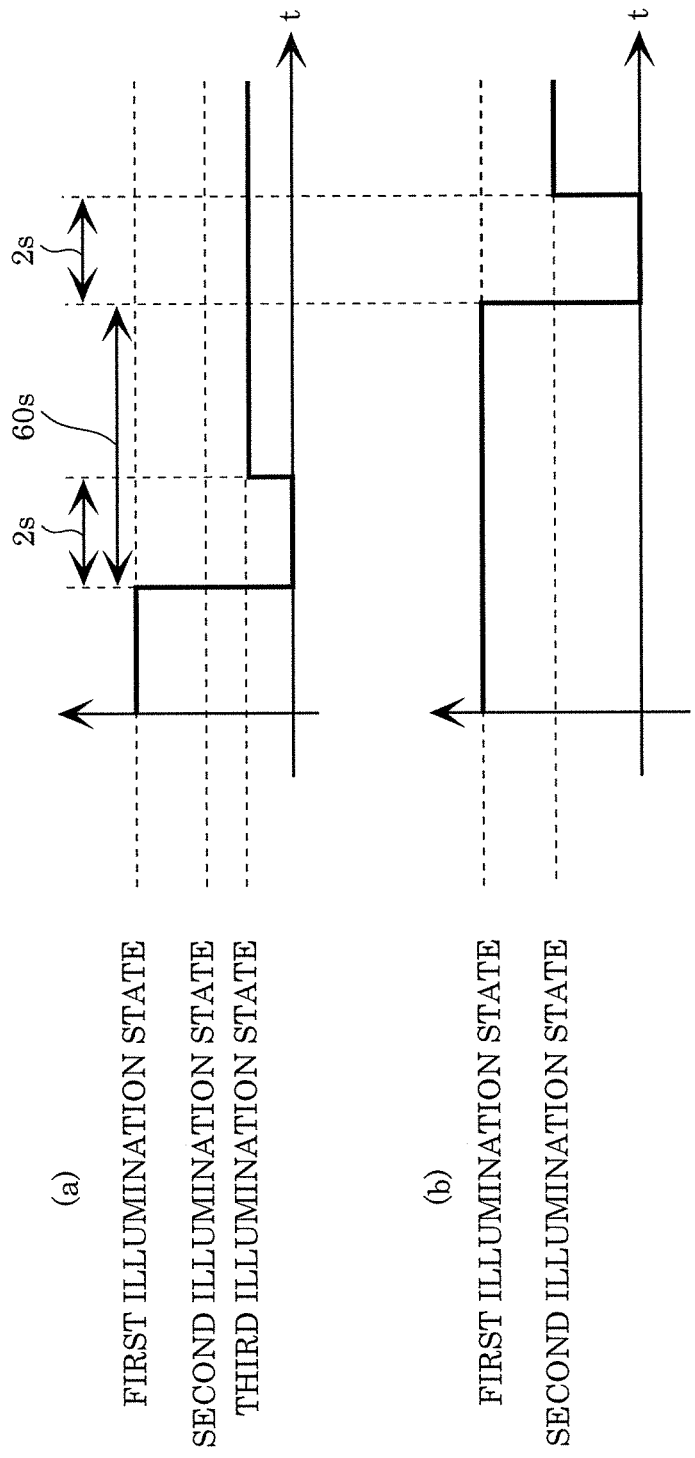
FIG. 9 is a diagram illustrating illumination states over time.

The illumination states of light fixtures 10 and 10a if detectors 17 included in light fixtures 10 and 10a detect such instant-off are to be described below, with reference to FIG. 9, in addition to FIG. 8. FIG. 9 is a diagram illustrating the illumination states over time.

As shown in (a) of FIG. 9, as switch 53 is turned instant-off in step S19, detector 17 included in light fixture 10 detects the instant-off (suspension for the first predetermined time period) of supply of the power (S21). In the example of (a) of FIG. 9, the first predetermined time period is two seconds, during which the light emission from light emitter 12 included in light fixture 10 is temporarily off. It should be noted that light emitter 12 being off also works as an advance notice of the demand control to the user.

Here, occupancy sensor 18 included in light fixture 10 has sensed no one in the second predetermined time period immediately before the detection of instant-off, and thus the illumination flag stored in storage 15 included in light fixture 10 is "0." Consequently, when supply of the power is resumed, controller 11 included in light fixture 10 causes light emitter 12 included in light fixture 10 to emit light in the third illumination state (S22).

Although not shown, detectors 17 included in respective light fixtures 110 and 210 acting as slaves of light fixture 10 detect the instant-off of supply of the power at the same time as step S21. Here, receiver 19a included in light fixture 110 and receiver 19a included in light fixture 210 have not received a sensing signal in the second predetermined time period immediately before the detection of instant-off. As a result, the illumination flag stored in storage 15 included in light fixture 110 and the illumination flag stored in storage 15 included in light fixture 210 are "0."

Thus, at the same time as step S22, controller 11 included in light fixture 110 causes light emitter 12 included in light fixture 110 to emit light in the third illumination state. Likewise, controller 11 included in light fixture 210 causes light emitter 12 included in light fixture 210 to emit light in the third illumination state.

On the other hand, as shown in (b) of FIG. 9, if switch 53a is turned instant-off in step S20, detector 17 included in light fixture 10a detects the instant-off (suspension for the first predetermined time period) of supply of the power (S23), at which time light emitter 12 included in light fixture 10a turns the lights off for two seconds.

Here, occupancy sensor 18 included in light fixture 10a has sensed a person in the second predetermined time period immediately before the detection of instant-off, and thus the illumination flag stored in storage 15 included in light fixture 10a is "1." Consequently, when supply of the power is resumed, controller 11 included in light fixture 10a causes light emitter 12 included in light fixture 10a to emit light in the second illumination state (S24). As shown in FIG. 9, switch 53a is turned instant-off, for example, 60 seconds after switch 53 is turned instant-off.

Although not shown, detectors 17 included in respective light fixtures 110a and 210a acting as slaves of light fixture 10a detect the instant-off of supply of the power at the same time as step S23. Here, receiver 19a included in light fixture 110a and receiver 19a included in light fixture 210a receive a sensing signal at step S17 mentioned above. In other words, receiver 19a included in light fixture 110a and receiver 19a included in light fixture 210a have received a sensing signal in the second predetermined time period immediately before the detection of instant-off. As a result, the illumination flag stored in storage 15 included in light fixture 110a and the illumination flag stored in storage 15 included in light fixture 210a are "1."

Thus, at the same time as step S24, controller 11 included in light fixture 110a causes light emitter 12 included in light fixture 110a to emit light in the second illumination state, and controller 11 included in light fixture 210a causes light emitter 12 included in light fixture 210a to emit light in the second illumination state.

[Operation 2 of Lighting System]

Next, the return operation of light fixtures 10 and 10a to the first illumination state in lighting system 100 is described. FIG. 10 is a diagram illustrating operation sequence of light fixtures 10 and 10a returning to the first illumination state in lighting system 100. While FIG. 10 shows an example in which switch controller 51 returns light fixtures 10 and 10a to the first illumination state, it should be noted that, as mentioned above, light fixtures 10 and 10a may be returned to the first illumination state by the user turning wall switch 20 on and off.

As with FIG. 8, in FIG. 10 also, assume that light emitter 12 included in light fixture 10 emits light in the third illumination state (S22) and light emitter 12 included in light fixture 10a emits light in the second illumination state (S24).

Then, if reception of a demand signal from demand controller 30 is ceased for the predetermined time period or longer (S25), switch controller 51 included in control panel 50 turns switches 53 and 53a off longer than the first predetermined time period (S26). It should be noted that in Embodiment 1, the "reception of a demand signal from demand controller 30 is ceased for the predetermined time period or longer" refers to a high period of the demand signal being ceased for the predetermined time period or longer (a low period of the demand signal continues for the predetermined time period and longer).

Once supply of the power is resumed, light emitter 12 included in light fixture 10 emits light in the first illumination state (S27), and light emitter 12 included in light fixture 10a emits light in the first illumination state (S28).

Although not shown, light fixtures 110, 210, 110a, and 210a acting as slaves also return to the first illumination state at the same time as steps S27 and S28.

[Advantageous Effects]

As described above, lighting system 100 includes light fixture 10, demand controller 30, and control panel 50. Light fixture 10 is connected to distribution panel 40 via power line 70, and emits light using the power supplied from power line 70. Demand controller 30 obtains a total power usage by a plurality of devices including light fixture 10 and which are connected to distribution panel 40 via power lines, and outputs a demand signal according to the total power usage. Control panel 50 includes switch 53 provided on power line 70 connected to light fixture 10, and switch controller 51 which suspends supply of the power for the first predetermined time period by turning off switch 53 for the first predetermined time period if switch controller 51 receives the demand signal.

Light fixture 10 includes light emitter 12 which emits light using the power supplied thereto, detector 17 which detects suspension of supply of the power, occupancy sensor 18, and controller 11. If detector 17 detects that the power being supplied to light emitter 12 emitting light in a first illumination state is suspended for the first predetermined time period and occupancy sensor 18 has sensed a person in the second predetermined time period immediately before detector 17 detects that the power being supplied to light emitter 12 emitting light in the first illumination state is suspended for the first predetermined time period, controller 11 causes light emitter 12 to emit light in the second illumination state dimmer than the first illumination state. If detector 17 detects that the power being supplied to light emitter 12 emitting light in the first illumination state is suspended for the first predetermined time period and occupancy sensor 18 has sensed no one in the second predetermined time period, controller 11 causes light emitter 12 to emit light in the third illumination state dimmer than the second illumination state.

This performs the demand control on light fixture 10 in a manner that if a person (user) is expected to be in the vicinity of light fixture 10, light fixture 10 emits brighter light than when no one is expected to be in the vicinity thereof, thereby providing enhanced user comfort and safety. Since a light fixture installed in an area believed to be vacant emits light dimmer than a light fixture installed in an area believed to be occupied, power consumption is efficiently reduced as well.

For example, control panel 50 may include a plurality of switches 53 and 53a, and lighting system 100 may include a plurality of light fixtures 10 and 10a corresponding to the plurality of switches 53 and 53a, respectively, wherein switch controller 51 turns off the plurality of switches 53 and 53a for the first predetermined time period at different times.

This allows dimming of light fixtures 10 and 10a, if they are installed in the same space, in a stepwise manner. Stated differently, this allows rapid dimming to be prevented, thereby providing enhanced user comfort and safety.

For example, control panel 50 may include storage 55 storing priorities of the plurality of switches 53 and 53a, and switch controller 51 may turn the plurality of switches 53 and 53a off for the first predetermined time period one after another, according to the priorities stored in storage 55.

This allows the plurality of light fixtures 10 and 10a to be dimmed one after another, according to the priorities stored in storage 55.

For example, each of the plurality of light fixtures 10 and 10a may further include transmitter 19. If occupancy sensor 18 included in one of the plurality of light fixtures 10 and 10a senses a person, transmitter 19 included in the one of the plurality of light fixtures 10 and 10a transmits identification information indicative of one of switches corresponding to the one of the plurality of light fixtures 10 and 10a. For example, control panel 50 may further include receiver 54 which receives the identification information transmitted by transmitters 19. Switch controller 51 may turn the switches off for the first predetermined time period in a manner that the one of the switches which is indicated by the identification information received by receiver 54 in the third predetermined time period immediately before switch controller 51 receives the demand signal is turned off later in time than turning off a switch corresponding to a light fixture from which receiver 54 receives no identification information in the third predetermined time period.

This allows light fixtures 10 and 10a, if they are installed in the same space, to be dimmed in the manner that the one of light fixtures 10 and 10a installed in an area believed to be vacant is dimmed earlier in time than dimming the other installed in an area believed to be occupied, thereby illuminating, for a long time, the area believed to be occupied. Thus, enhanced user safety and comfort are achieved.

For example, light fixture 10 may further include transmitter 19 which transmits, if occupancy sensor 18 senses a person, a signal (sensing signal) for causing light fixtures 110 and 210, which is different from light fixture 10 and do not include occupancy sensor 18, to emit light in the second illumination state or the third illumination state. Light fixtures 110 and 210 are by way of example of a second light fixture.

This allows causing light fixtures 110 and 210, which are provided without occupancy sensor 18, to emit light in an illumination state according to a sensor result obtained by occupancy sensor 18.

For example, if detector 17 detects that the power being supplied to light emitter 12 emitting light in the second illumination state or the third illumination state is suspended longer than the first predetermined time period, and supply of the power is then resumed, controller 11 may cause light emitter 12 to emit light in the first illumination state.

This allows returning the illumination state of light emitted by light emitter 12 from the second illumination state or third illumination state before the suspension of power to the first illumination state.

For example, light fixture 10 may further include setting receiver 13 which receives settings of the first illumination state, the second illumination state, and the third illumination state which are adjusted by the user.

This allows the user to arbitrarily set respective brightness levels of the first illumination state, the second illumination state, and the third illumination state.

It should be noted that demand controller 30 outputs the demand signal if a total power usage is estimated to exceed the predetermined target usage. The first predetermined time period is, for example, one second or longer and two seconds or less, and the second predetermined time period is, for example, 30 minutes or longer and less than two hours.

It should be noted that lighting system 100 also yields advantageous effects that the plurality of light fixtures are readily, collectively controlled, using existing power lines. For a consumer which already has introduced demand controller 30, lighting system 100 can readily be introduced simply by installing control panel 50, and replacing existing light fixtures with light fixture the same as light fixture 10 (or light fixture 110). In other words, the introduction of lighting system 100 does not require a large-scale construction work such as hooking up new control wiring.

[Variation]

In the case where occupancy sensor 18 included in light fixture 10 is an imaging module, such an occupancy sensor 18 can sense a dwell time of light fixture 10 that includes occupancy sensor 18. The dwell time is a length of time a person spends in the installation location of light fixture 10.

For example, assume occupancy sensor 18 is monitoring, from the ceiling, a room in which a table and a chair are placed. At this time, occupancy sensor 18 captures an empty room as a reference image, and recognizes the location of the chair. Occupancy sensor 18 can sense presence or absence of a person (object) by comparing the reference image and an image being captured.

Here, if occupancy sensor 18 senses an object at a location where the chair is placed, it may be assumed that a person is sitting on the chair. In such a case, occupancy sensor 18 determines that a dwell time of the person is going to be long.

For example, if occupancy sensor 18 senses an object at a location other than where the chair is placed, it may be assumed that a person is standing or moving in the room. In such a case, occupancy sensor 18 determines that a dwell time of the person is going to be short. Occupancy sensor 18 determines that the room is vacant if the reference image and an image being captured substantially match and no one is sensed.

As described above, in the case where occupancy sensor 18 is an imaging module, such an occupancy sensor 18 included in light fixture 10 can sense a dwell time of a person in the installation location of light fixture 10 in a simplified manner.

Transmitter 19 included in light fixture 10 further transmits dwell time information and receiver 54 of control panel 50 receives the dwell time information transmitted by transmitter 19. The dwell time information indicates a dwell time which is sensed by occupancy sensor 18 immediately before detector 17 detects instant-off of supply of power. Likewise, transmitter 19 included in another light fixture (e.g., light fixture 10a) acting as a master also transmits dwell time information indicative of a dwell time sensed by occupancy sensor 18 included in the other light fixture.

This allows switch controller 51 to carry out instant-off control on the switches according to a dwell time of a person. Switch controller 51, specifically, turns the switches off in a manner that the longer the dwell time indicated by dwell time information on an installation location, the later in time a switch corresponding to a light fixture indicating a longer dwell time among the plurality of light fixtures is turned off.

For example, lighting system 100 may include three light fixtures acting as masters, and it may be assumed based on sensor results obtained by occupancy sensors 18 included in respective light fixtures that a dwell time of a person at a location where a first light fixture is installed is going to be long, a dwell time of a person at a location where a second light fixture is installed is going to be short, and a location where a third light fixture is installed is vacant. In such a case, switch controller 51 turns instant-off the switches included in respective light fixtures one after another, starting with a switch corresponding to the third light fixture, a switch corresponding to the second light fixture, and a switch corresponding to the first light fixture.

This allows the light fixtures to be dimmed such that the longer the dwell time of a person in the vicinity of a light fixture is expected, the later in time the light fixture is dimmed, thereby illuminating, for a long time, an area where a person is believed to stay long. As a result, enhanced user comfort and safety are achieved.

OTHER EMBODIMENTS

While lighting system 100 according to Embodiment 1 has been described above, the present disclosure is not limited to Embodiment 1 described above.

For example, Embodiment 1 described above has been described with reference to the light fixture communicating with another light fixture and control panel 50 both through weak radio communications. However, different communication methods may be employed to perform the communications between the light fixtures and the communications between light fixture and control panel 50.

For example, while Embodiment 1 described above has been set forth with reference to the rewritable priorities stored in storage 55 included in control panel 50, the priorities stored in storage 55 included control panel 50 may be predetermined and fixed.

For example, while Embodiment 1 above has been described with reference to light fixture 10 (and the other light fixtures acting as a master) including occupancy sensor 18, occupancy sensor 18 may at least be included in lighting system 100 and may be a separate component from light fixture 10. In this case, a sense result obtained by occupancy sensor 18 is transmitted to light fixture 10 through wired or wireless communications.

For example, light fixture 10 (and another light fixture acting as master) may include a different sensor in place of or in addition to occupancy sensor 18.

For example, light fixture 10 may include an illuminance sensor. In this case, transmitter 19 included in light fixture 10 may transmit to receiver 54 information indicative of illuminance sensed by the illuminance sensor.

In this case, switch controller 51 may turn the switches off for the first predetermined time period in a manner that a switch corresponding to a light fixture, whose illuminance received by receiver 54 in the third predetermined time period immediately before switch controller 51 receives a demand signal is predetermined brightness or greater, is turned off later in time than turning off a switch corresponding to a light fixture whose illuminance received by receiver 54 in the third predetermined time period is less than the predetermined brightness. This allows control panel 50 to perform the demand control on the switches in an order according to illuminance of corresponding light fixtures.

For example, in Embodiment 1 described above, the light emitting element included in light emitter 12 is at least one LED or LED element. However, the light emitting element included in light emitter 12 may be, for example, at least one semiconductor light emitting element such as a semiconductor laser, a solid-state light emitting device such as an organic electro luminescence (EL) or inorganic EL for example, or even a fluorescent lamp.

It should be noted that each component in Embodiment 1 described above may be configured with dedicated hardware or may be implemented by executing a software program suitable for the component. Each component may be implemented by a program execution unit, such as a CPU or processor, loading and executing the software program stored in a recording medium such as a hard disk or a semiconductor memory.

For example, the components may be circuits (or integrated circuits). These circuits may form one circuitry as a whole or be individual circuits. For example, these circuits may be general purpose circuits or may be dedicated circuits.

For example, general and specific aspects of the present disclosure may be implemented by a system, apparatus, method, integrated circuit, computer program, or computer-readable recording medium such as a CD-ROM. The general and specific aspects of the present disclosure may also be implemented by any combination of systems, apparatuses, methods, integrated circuits, computer programs, or computer-readable recording media. For example, the present disclosure may be implemented as light fixture 10 included in lighting system 100 described above, or may be implemented as control panel 50 (control apparatus). The present disclosure may also be implemented as a method for controlling light fixture 10 included in lighting system 100.

For example, the order of the processes included in the operation sequence of lighting system 100 set forth in Embodiment 1 described above is an example. The processes may be performed in different order or may be performed in parallel.

In other instances, various modifications to the embodiments according to the present invention described above that may be conceived by a person ordinary skilled in the art and embodiments implemented by any combination of the components and functions shown in the embodiments are also included within the scope of the present invention, without departing from the spirit of the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting system comprising:
   a light fixture connected to a distribution panel via a power line, wherein the light fixture emits light using power supplied from the power line;
   a demand controller which obtains a total power usage by a plurality of devices including the light fixture, which are connected to the distribution panel via power lines, and outputs a demand signal according to the total power usage;
   a control apparatus which includes
      a switch provided on the power line connected to the light fixture, and
      a switch controller which suspends supply of the power for a first predetermined time period by turning off the switch for the first predetermined time period when the switch controller receives the demand signal; and
   an occupancy sensor, wherein:
   the light fixture includes
      a light emitter which emits light using the power supplied,
      a detector which detects that supply of the power is suspended, and
      a controller, and
   when the detector detects that the power being supplied to the light fixture emitting light in a first illumination state is suspended for the first predetermined time period, the controller:
   (i) causes the light emitter to emit light in a second illumination state dimmer than the first illumination state when the occupancy sensor has sensed a person in a second predetermined time period immediately before the detector detects that the power being supplied to the light fixture emitting light in the first illumination state is suspended for the first predetermined time period; and (ii) causes the light emitter to emit light in a third illumination state dimmer than the second illumination state when the occupancy sensor has sensed no one in the second predetermined time period.

2. The lighting system according to claim 1, wherein the control apparatus includes a plurality of switches each functioning as the switch, the lighting system further comprises a plurality of light fixtures corresponding to the plurality of switches and each being configured as the light fixture, and the switch controller turns off the plurality of switches for the first predetermined time period at different times.

3. The lighting system according to claim 2, wherein the control apparatus further includes a storage storing priorities of the plurality of switches, and the switch controller turns the plurality of switches off for the first predetermined time period one after another, according to the priorities stored in the storage.

4. The lighting system according to claim 2, wherein each of the plurality of light fixtures includes a transmitter, when the occupancy sensor included in one of the plurality of light fixtures senses a person, the transmitter included in the one of the plurality of light fixtures transmits identification information indicative of one of the switches corresponding to the one of the plurality of light fixtures, the control apparatus further includes a receiver which receives the identification information transmitted by the transmitter, and the switch controller turns the plurality of switches off for the first predetermined time period in a manner that the one of the switches which is indicated by the identification information received by the receiver in a third predetermined time period immediately before the switch controller receives the demand signal is turned off later in time than turning off a switch corresponding to a light fixture from which the receiver receives no identification information in the third predetermined time period among the plurality of light fixtures.

5. The lighting system according to claim 4, wherein the occupancy sensor included in the one of the plurality of light fixtures further senses a dwell time which is a length of time a person spends in an installation location of the one of the plurality of light fixtures which includes the occupancy sensor, the transmitter included in the one of the plurality of light fixtures further transmits dwell time information indicative of the dwell time, the receiver further receives the dwell time information transmitted by the transmitter, and the switch controller turns the plurality of switches off for the first predetermined time period in a manner that the longer the dwell time indicated by dwell time information on an installation location, the later in time a switch corresponding to a light fixture indicating a longer dwell time among the plurality of light fixtures is turned off.

6. The lighting system according to claim 1, further comprising a second light fixture that does not include an occupancy sensor, wherein the light fixture further includes a transmitter which transmits, when the occupancy sensor senses a person, a signal for causing the second light fixture that has emitted light in the first illumination state to emit light in the second illumination state or the third illumination state.

7. The lighting system according to claim 1, wherein when the detector detects that the power being supplied to the light emitter emitting light in the second illumination state or the third illumination state is suspended longer than the first predetermined time period, and supply of the power is resumed, the controller causes the light emitter to emit light in the first illumination state.

8. The lighting system according to claim 1, wherein the light fixture further includes a setting receiver which receives settings of the first illumination state, the second illumination state, and the third illumination state which are adjusted by a user.

9. The lighting system according to claim 1, wherein the demand controller outputs the demand signal when the total power usage is estimated to exceed a predetermined target usage.

10. The lighting system according to claim 1, wherein the first predetermined time period is one second or longer and two seconds or less, and the second predetermined time period is 30 minutes.

11. A method for controlling a light fixture included in a lighting system, the lighting system including
a light fixture connected to a distribution panel via a power line, wherein the light fixture emits light using power supplied from the power line,
a demand controller which obtains a total power usage by a plurality of devices including the light fixture and which are connected to the distribution panel via power lines, and outputs a demand signal according to the total power usage,
a control apparatus which includes
a switch provided on the power line connected to the light fixture, and
a switch controller which suspends supply of the power for a first predetermined time period by turning off the switch for the first predetermined time period when the switch controller receives the demand signal, and an occupancy sensor,
the light fixture including
a light emitter which emits light using the power supplied; and
a detector which detects that supply of the power is suspended, when the detector detects that the power being supplied to the light fixture emitting light in a first illumination state is suspended for the first predetermined time period, the method comprising steps of:

(i) causing the light emitter to emit light in a second illumination state dimmer than the first illumination state when the occupancy sensor has sensed a person in a second predetermined time period immediately before the detector detects that the power being supplied to the light fixture emitting light in the first illumination state is suspended for the first predetermined time period; and (ii) causing the light emitter to emit light in a third illumination state dimmer than the second illumination state when the occupancy sensor has sensed no one in the second predetermined time period.

* * * * *